Patented Aug. 2, 1938

2,125,656

UNITED STATES PATENT OFFICE 2,125,656

METHOD OF PRODUCING HALOGENATED SULPHATES AND SULPHONATES

Walther Schrauth, Berlin-Dahlem, Germany, assignor, by mesne assignments, to "Unichem" Chemikalien Handels A.-G., Zurich, Switzerland, a corporation of Switzerland No Drawing. Application January 24, 1934, Serial No. 708,108. In Germany January 25, 1933

14 Claims. (Cl. 260—99.12)

The present invention relates to sulphates and sulphonates of unsaturated fatty alcohols and has for an object to provide an improved process for producing sulphates and/or sulphonates of unsaturated fatty alcohols in which a halogen is introduced at the double bond position.

Another object is to provide an improved process wherein a product of this character can be produced in a substantially pure state and free from catalysts or the like which may be separated from the product.

Another object is to provide an effective process which can be operated expeditiously and economically.

A variety of products can be produced by the reaction of sulphuric acid and/or other sulphating agents on unsaturated fatty alcohols of which oleyl alcohol is sufficiently representative. The unsaturated sulphuric acid esters of such alcohols in which the double bond remains after the reaction are distinguished by their ready solubility even in cold water but they are less stable as, for example, against hydrolyzing influences and the like.

It has been discovered that products which retain the ready solubility even in cold water but which have the additional quality of greater stability can be produced if unsaturated fatty alcohols are sulphated and/or sulphonated with a halogen sulphonic acid and the evolved hydrohalic gas is caused to react at the double bond to introduce halogen into the sulphate and/or sulphonate.

The alcohols used as starting materials may be unsaturated, primary, aliphatic alcohols, (usually monohydric) having from 8 to 30 carbon atoms in the molecule and at least one double bond. The preferred alcohols are those having from 12 to 20 carbon atoms in the molecule of which oleyl alcohol is commercially readily available and sufficiently representative. As a sulphating and sulphonating agent chloro-sulphonic acid is commercially the most practicable.

It has been proposed heretofore to treat certain derivatives of the natural fats and waxes with chloro-sulphonic acid in the presence of a catalyst to cause a reaction introducing chlorine at the double bond position. The methods proposed have been wasteful of the materials used and subject to other disadvantages. It is a feature of the present invention that provision is made for preventing the escape of the evolved hydrohalic gas from the reaction mixture and thereby insuring a reaction of such gases at the double bond position.

Different expedients may be adopted to this end either separately or in conjunction. The reaction may be carried on in an autoclave. If so, the autoclave may be filled with hydrohalic gas or halogen gas corresponding to the halogen sulphonic acid used, for example hydrochloric acid, if chloro-sulphonic acid is used in the reaction, and a superatmospheric pressure may be maintained if desired, for example, a pressure from 1 to 3 atmospheres. The reaction may be carried on at reduced temperature to inhibit the ebullition of acid gas. To this end the temperature selected may even be so low that it is only slightly above the solidification temperature of the reaction mixture. For example, undiluted oleyl alcohol may be reacted with chloro-sulphonic acid at a temperature approximating 3° to 10° C.

It will be understood that when the reaction takes place in an autoclave and especially in an atmosphere of hydrohalic gas, whether or not superatmospheric pressure is applied, a higher temperature may be used; for example, a temperature even as high as 25° C. While the temperature of the reaction may range anywhere between the temperature at which the reaction mixture solidifies and a temperature approximating 25° C. better results are obtained if the temperature is between 4° C. and 20° C. and the pressure is between 1 and 2 atmospheres.

The reaction mixture may also be diluted with a solvent in which the hydrohalic gas is readily soluble. Examples of such solvents are ether, liquid sulphur dioxide, low boiling hydrocarbons and the like.

Under certain conditions as when using an effective solvent and low temperatures the reaction may be carried on at sub-atmospheric pressure.

It is one of the advantages of the process of the invention that the reaction can be carried on without the use of a catalyst with the result that the finished product is not contaminated by the presence of metal salts or other catalytic material to be separated. It is another advantage of the present process, especially when carried on at low temperatures, that the product consists chiefly of sulphuric acid esters with a relatively small proportion of true sulphonic acids.

The product obtained provides an excellent cleaning, wetting-out and emulsifying agent of considerable value for use in the textile industry. The halogenated esters and/or sulphonic acids may be used as such or they may be neutralized with various bases such as alkali metals or organic bases, as for example guanidine, urea, betaine, thio-urea, chinoline, isochinoline, pyridine, piperidine, ethanolamines, tri-ethylamine, cyclo-hexylamine.

*Example 1.*—60 kgs. of oleyl alcohol diluted with 40 kgs. of ether is reacted with 40 kgs. of chloro-sulphonic acid at a temperature approximating 8° C. for 6 hours. The autoclave is charged with hydrochloric acid gas at a pressure of 2 atmospheres.

*Example 2.*—60 kgs. of oleyl alcohol of iodine number 89 (solidification point 2.5°) are cooled to 4° C. and mixed slowly with 40 kgs. of chloro-sulphonic acid, the mixture being cooled during the mixing to maintain the temperature at all times below 10° C., so that no substantial evolution of gas takes place.

The product of either Example 1 or 2 neutralized with an alkali metal, is readily soluble in water at room temperature, stable when boiled, does not become turbid even when boiled with water of a hardness of 50° (German table of hardness) and develops an ample stable foam. The product also has a strong degreasing effect which is highly desirable in the treatment of fibrous material.

The term "sulphonation" is used in the claims in the broad sense to include both sulphation and true sulphonation.

What I claim is:

1. A process for producing halogenated derivatives of sulphated unsaturated fatty alcohols which comprises reacting the unsaturated fatty alcohol with halogen sulphonic acid, the halogen gases evolved during this reaction being maintained in contact with the reaction mixture.

2. The method of producing sulphonation products of fatty alcohols which comprises causing unsaturated fatty alcohol dissolved in ether to react with halogen sulphonic acid and maintaining the hydrohalic acid evolved in contact with the reaction product in an autoclave at a temperature between 4° and 20° C. until the hydrohalic acid reacts with said reaction product.

3. The method of producing sulphonation products of fatty alcohols which comprises reacting unsaturated fatty alcohol with chloro-sulphonic acid in an autoclave in an atmosphere of hydrochloric acid gas, said hydrochloric gas being maintained in contact with the mixture during the reaction.

4. The method of producing sulphonation products of fatty alcohols which comprises reacting unsaturated fatty alcohol dissolved in a solvent in which hydro-chloric acid is readily soluble with chloro-sulphonic acid at a temperature below 10° C. in an autoclave which retains the evolved hydrochloric acid gas in contact with the reaction mixture.

5. The method of producing sulphonation products of oleyl alcohol which comprises reacting oleyl alcohol with chloro-sulphonic acid at a temperature approximating 5° to 10° C. in an autoclave which retains the evolved hydrochloric acid gas in contact with the reaction mixture.

6. The method of producing sulphonation products of oleyl alcohol which comprises reacting oleyl alcohol with chloro-sulphonic acid in an autoclave in an atmosphere of hydro-chloric acid gas at a pressure of 2 atmospheres.

7. The product of the process defined in claim 1.

8. A halogenated alkyl sulphuric acid ester corresponding to the formula R—O—$SO_3H$ where R stands for a halogen-bearing alkyl radical containing from 12 to 18 carbon atoms.

9. The method of producing halogenated sulphonation products of fatty alcohols which comprises reacting unsaturated fatty alcohol with halogenated sulphonic acid and retaining the evolved hydrohalic acid gas in contact with the reaction products to cause reaction of said hydrohalic gas with the reaction products.

10. A halogenated alkyl sulphate containing at least 8 carbon atoms in the molecule.

11. A chlorinated alkyl sulphate containing 18 carbon atoms.

12. A halogenated alkyl sulphate containing at least 8 carbon atoms in the molecule, wherein the halogen is connected to the alkyl chain in an intermediate position.

13. A halogenated alkyl sulphuric acid ester corresponding to the formula R—O—$SO_3X$ wherein R represents a halogen bearing alkyl radical containing at least 8 carbon atoms in the molecule and X is a member of the group consisting of hydrogen and bases.

14. A halogenated alkyl sulphuric acid ester corresponding to the formula R—O—$SO_3X$ wherein R represents a halogen bearing alkyl radical containing from 12 to 18 carbon atoms in the molecule and X is a member of the group consisting of hydrogen and bases.

WALTHER SCHRAUTH.